United States Patent
Zhou

(10) Patent No.: US 8,193,800 B2
(45) Date of Patent: Jun. 5, 2012

(54) VOLTAGE CONTROLLED ON-CHIP DECOUPLING CAPACITANCE TO MITIGATE POWER SUPPLY NOISE

(75) Inventor: Yaping Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/020,882

(22) Filed: Jan. 28, 2008

(65) Prior Publication Data

US 2009/0189713 A1 Jul. 30, 2009

(51) Int. Cl.
*G05F 1/00* (2006.01)
*H02J 1/02* (2006.01)

(52) U.S. Cl. .......................... 323/293; 363/39

(58) Field of Classification Search .......... 323/233, 323/299, 364, 293; 333/174, 181; 363/39, 363/40, 44
See application file for complete search history.

(56) References Cited

U.S. PATENT DOCUMENTS

| | | | |
|---|---|---|---|
| 4,575,687 A | 3/1986 | Moore, Jr. | |
| 4,972,101 A | 11/1990 | Partovi et al. | |
| 6,052,036 A | 4/2000 | Enstrom et al. | |
| 6,069,521 A | 5/2000 | Taylor et al. | |
| 6,104,255 A | 8/2000 | Goma et al. | |
| 6,509,785 B2 | 1/2003 | Ang et al. | |
| 7,427,907 B2 * | 9/2008 | Sheng et al. | 334/15 |
| 7,548,136 B1 * | 6/2009 | Shah | 333/174 |
| 2001/0004227 A1 * | 6/2001 | Frech et al. | 333/181 |
| 2002/0105765 A1 * | 8/2002 | Kondo et al. | 361/42 |
| 2005/0062523 A1 * | 3/2005 | Wang et al. | 327/554 |
| 2008/0055018 A1 * | 3/2008 | Umamichi et al. | 333/181 |
| 2008/0081583 A1 * | 4/2008 | Zhang et al. | 455/193.1 |
| 2008/0251888 A1 * | 10/2008 | Agarwal et al. | 257/532 |
| 2009/0140720 A1 * | 6/2009 | Koerner | 324/76.11 |

OTHER PUBLICATIONS

Sanjay Pant and David Blaauw, "An Actice Decoupling Capacitance Circuit for Inductive Noise Suppression in Power Supply Netwroks", Oct. 2007, Computer Design 2006 International Conference.*

* cited by examiner

*Primary Examiner* — Adolf Berhane
*Assistant Examiner* — Jeffrey Gblende
(74) *Attorney, Agent, or Firm* — Yudell Isidore Ng Russell PLLC

(57) ABSTRACT

A method and system for reducing the noise level of a power supply system with the implementation of a voltage controlled decoupling capacitor in an electrical circuit. Voltage variations of the power supply caused by switching currents are detected by a voltage sensor control circuit. The voltage sensor circuit compares a stable reference voltage with the varying voltage level of the power supply in order to generate a sensor control voltage. When applied to the decoupling capacitor, the control voltage adjusts the capacitance of the voltage controlled capacitor. The adjusted capacitance allows the voltage controlled decoupling capacitor to compensate for the effects of the voltage variations by supplying an increased quantity of charge to various circuit components. Thus, the voltage controlled capacitor is able to efficiently reduce noise within the power supply system.

20 Claims, 6 Drawing Sheets

VOLTAGE CONTROLLED ON-CHIP DECOUPLING CAPACITANCE TO MITIGATE POWER SUPPLY NOISE

BACKGROUND

1. Technical Field

The present invention generally relates to electrical circuits and in particular to power supply systems in electrical circuits.

2. Description of the Related Art

In most microprocessor chips and other on-chip electrical devices, on-chip switching activities of transistors and other components generate switching current(s), I(t). These switching currents cause noise in the power supply system. The power supply systems generally consists of: (1) an on-chip decoupling capacitor (decap) "C_onchip"; and (2) a package/board with other decap components and voltage regulator module(s) (VRM). Of these two mechanisms that make up the power supply system, C_onchip is the most efficient decoupling contributor for reducing noise because of the proximity of C_onchip to the switching transistors. However, the amount (i.e., the capacitance) of C_onchip is limited. For example, in one typical microprocessor chip, the capacitance associated with C_onchip is ~0.2 uF, while, for comparison, package decaps have capacitance of 66 uF.

When a large "dI/dt" (i.e., rate of change of current) event occurs and charges are needed by transistors, C_onchip acts as a local battery to supply the charges. On-chip capacitance stores total charge "Qtotal" (where Qtotal=Vo*C_onchip, where Vo is the nominal voltage and "*" refers to the multiplication operation). But only a charge of "Q" may be supplied to the transistors. Here, Q=$\Delta$V*C_onchip, where the symbol (delta) "$\Delta$" represents "a change in". Thus, $\Delta$V refers to a change in the value of V, or voltage "droop"). Usually, $\Delta$V/Vo is required to be less than 10%; otherwise, the chip may not function properly and operation at a maximum operating frequency "fmax" may be compromised. This means that, at most, only 10% of the charges stored on C_onchip is utilized in mitigating noise.

On-chip capacitance comes from structures that occupy precious on-chip estate. In the BE chip, C_onchip comes from gate capacitance of transistors dedicated to decoupling. To increase the amount of charge that C_onchip is able to supply, one obvious but costly way is to increase the size of C_onchip. However, a larger C_onchip means increasing the size of the integrated circuit(s).

SUMMARY OF ILLUSTRATIVE EMBODIMENTS

Disclosed are a method and system for reducing the noise level of a power supply system with the implementation of a voltage controlled decoupling capacitor in an electrical circuit. Voltage variations of the power supply caused by switching currents are detected by a voltage sensor control circuit. The voltage sensor circuit compares a stable reference voltage with the varying voltage level of the power supply in order to generate a sensor control voltage. When applied to the decoupling capacitor, the control voltage adjusts the capacitance of the voltage controlled decoupling capacitor. The adjusted capacitance allows the voltage controlled decoupling capacitor to compensate for the effects of the voltage variations by supplying an increased quantity of charge to various circuit components. Thus, the voltage controlled decoupling capacitor is able to efficiently reduce noise within the power supply system.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
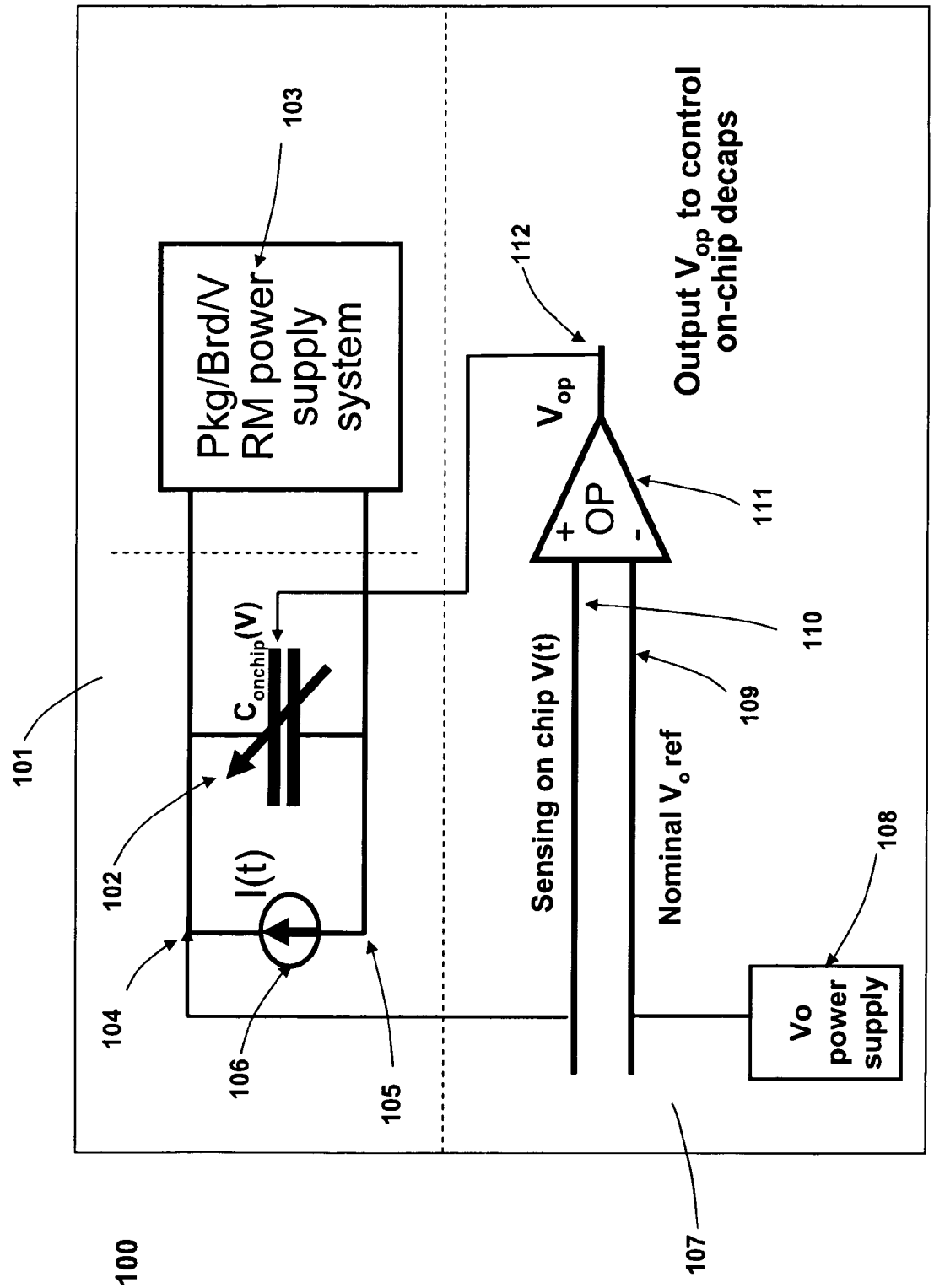
FIG. 1 is a block diagram representation of an electrical circuit comprising a power supply system sub-circuit and a voltage sensor sub-circuit, according to one embodiment of the invention.

The illustrative embodiments provide a method and system for reducing the noise level of a power supply system with the implementation of a voltage controlled decoupling capacitor in an electrical circuit. Voltage variations of the power supply caused by switching currents are detected by a voltage sensor control circuit. The voltage sensor control circuit compares a stable reference voltage with the varying voltage level of the power supply in order to generate a sensor control voltage. When applied to the decoupling capacitor, the control voltage adjusts the capacitance of the voltage controlled decoupling capacitor. The adjusted capacitance allows the voltage controlled decoupling capacitor to compensate for the effects of the voltage variations by supplying an increased quantity of charge to various circuit components. Thus, the voltage controlled decoupling capacitor is able to efficiently reduce noise within the power supply system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, there is depicted a block diagram representation of an electrical circuit comprising a power supply system sub-circuit and a voltage sensor sub-circuit, according to one embodiment of the invention. Circuit 100 comprises power supply sub-circuit (PSSC) 101 and voltage sensor sub-circuit (VSSC) 107. PSSC 101 comprises voltage dependent decoupling capacitor (decap/C_onchip) 102 connected, in parallel, to power supply system 103 and switching current "I(t)" 106 at a first node 104 and second node 105. Throughout the description which follows, capacitor (102) is interchangeably referred to as decap 102 and/or C-onchip 102. Thus, in PSSC 101, a switching current "I(t)" 106 flows along a current path connecting first node 104 and second node 105, which path runs parallel to C_onchip 102 and power supply system 103.

VSSC 107 comprises Operational amplifier (OpAmp) 111 and a power supply 108, which produces a nominal reference voltage, "Vo" 109. The voltage at first node 104 of PSSC 101 is provided as first input voltage ("V(t)") 110 to OpAmp 111 in VSSC 107. Reference voltage "Vo" 109 is provided as the second input voltage to OpAmp 111. Opamp 111 yields control voltage "Vop" 112 as the output. Vop 112 is then applied to decap/C_onchip 102 to control the capacitance value.

Among the functionality provided by circuit 100 (configured with PSSC 101 and VSSC 107 as illustrated by FIG. 1), and which are specific to the invention, are: (a) the capability to sense a varying voltage level of a power supply; and (b) the capability to reduce a noise level of the power supply by implementing a voltage controlled decoupling capacitor. According to the illustrative embodiment, circuit 100 enables the above functional features as well as additional features/functionality, which are described below within the description of FIGS. 2-5.

Those of ordinary skill in the art will appreciate that the devices/components and basic configuration depicted in FIG. 1 may vary. For example, other devices/components may be used in addition to or in place of those depicted. The depicted example is not meant to imply architectural limitations with respect to the present invention.

In circuit 100, voltage dependent (dynamic) capacitor 102 is employed to reduce the power supply noise which results from switching current I(t). One or more power supply noise sensing/monitoring circuits (e.g., VSSC 107) is implemented in circuit 100. The one or more noise monitoring circuit(s) (107) comprises an operational amplifier (such as OpAmp 111).

In circuit 100, OpAmp 111 monitors noisy power supply voltage V(t). V(t) 110 is compared to nominal reference voltage Vo 109 (supplied by Vo power supply 108) and control signal Vop 112 is generated as the output of OpAmp 111. The value of Vop is determined as "Vop=A*(V(t)−Vo), where "A" is the gain of voltage sensor sub-circuit 107. Dynamic capacitor, (C_onchip 102), is a voltage dependent on-chip decoupling capacitance controlled by signal Vop 112, such that capacitance of C_onchip 102 increases when V(t) increases and vice versa. Furthermore, when there is a voltage drop below a nominal voltage "Vo" level (i.e., a voltage "droop"), indicated as V(t)<Vo, capacitance of C_onchip 102 decreases significantly. When there is a voltage bounce, indicated as V(t)>Vo, capacitance of C_onchip 102 increases significantly.

On-chip capacitance stores a total charge "Qtotal", where Qtotal=Vo*C_on-chip. However, only Q=ΔV*C_onchip (which is measurably smaller than Qtotal) may be supplied to the transistors. The symbol (delta) "Δ" represents "a change in". Thus, ΔV refers to a change in the value of V. In implementation, ΔV/Vo is less than 10% (i.e., the change in voltage is less than 10% at any given time), and thus, less than 10% of the charge stored in C_onchip 102 is utilized in mitigating noise. If C_onchip also decreases by ΔC when there is a voltage "droop" ΔV (where "droop" refers to a voltage drop below a nominal voltage level "Vo", which drop is induced by switching current(s) I(t)), the new on-chip capacitance is capable of supplying "Qnew", where:

$$Qnew = Vo*C\_onchip - (Vo-\Delta V)*(C\_onchip - \Delta C),$$
$$= \Delta V*C\_onchip + (Vo-\Delta V)*\Delta C$$
$$= Q + (Vo-\Delta V)*\Delta C,$$

where $Q = \Delta V * C\_onchip.$

The new value of C_onchip 102 supplies an extra charge of (Vo−ΔV)*ΔC>0. A similar analysis may be made when there is a voltage bounce, which, as described above, refers to a voltage spike above a nominal voltage "Vo" level induced by switching current(s) I(t)). However, a power supply droop is usually more of a concern in electrical circuits. With C_onchip controlled by V(t), a larger quantity of charges stored on C_onchip may be made available for transistors. Therefore, power supply noise is reduced.

In other words, at the stable state, on-chip capacitance stores Qtotal=Vo*C_on-chip. When there is a droop, V(t)<Vo, on-chip capacitance is C_onchip-C_onchip. Then, the voltage across the decap (102) becomes Qtotal/[C_onchip−ΔC_onchip]>Vo. A decap acts as a local voltage booster to pull up the voltage on the power grid. The opposite occurs when V(t)>Vo. Therefore, such controlled C_onchip (102) reduces noise.

Sensing circuit or sub-circuit (VSSC) 107 may be achieved with only one additional OpAmp needed to monitor V(t) 110 and control C_onchip 102. Since Vop 112 (where Vop=A*(Vo−V(t)), and A is the gain of OpAmp 111) controls C_onchip 102, the gain A controls how significantly capacitance of C_onchip 102 changes with V(t) 110. The polarity of Vop 112 is made to be such that capacitance of C_onchip 102 decreases when V(t)<Vo, and vice versa. If needed, in alternate embodiments, a DC offset may be added to Vop. Also, output impedance (at OpAmp 111) is designed to be very large. Multiple OpAmps (111) may be implemented to monitor local noises or to minimize the delay from OpAmps (111) to decaps (102).

Figure 2:
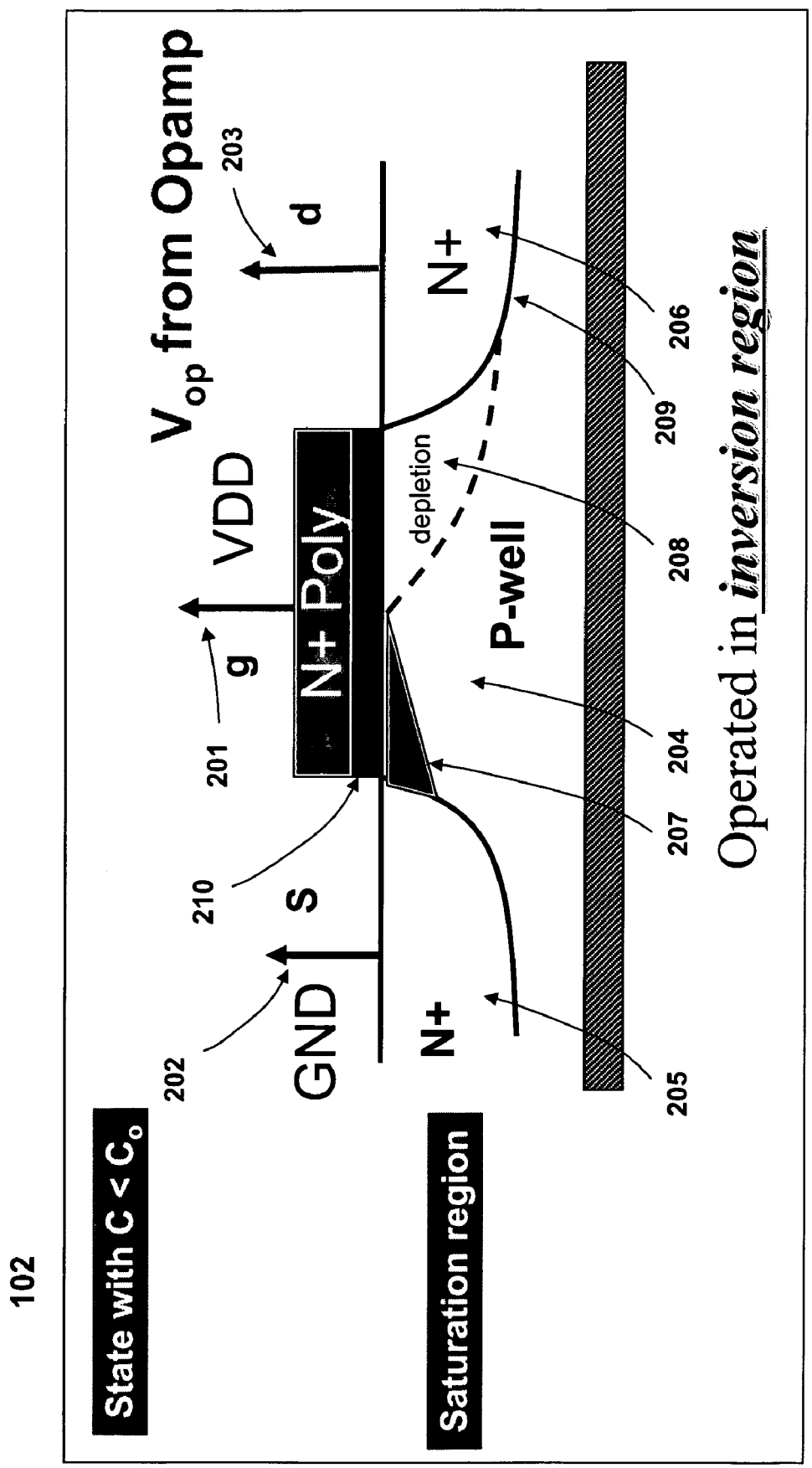
FIG. 2 illustrates a decoupling capacitor provided by transistor gate capacitance, according to one embodiment of the invention.

FIG. 2 illustrates an example decoupling capacitor (102), which is provided by transistor gate capacitance, according to one embodiment of the invention. Decap 102 comprises (VDD) gate terminal 201, (GND/N+) source terminal 202 connected to first N+ region 205 and (Vop/P+) drain terminal 203 connected to second N+ region 206. Decap 102 further comprises PN junction 209 at the boundary of P-well region 204 and second N+ region 206. Decap 102 also comprises inversion layer 207. Also included in decap 102 is depletion region 208. Additionally, decap 102 includes gate oxide 210. In decap 102, PN junction 209 is formed along the boundary of P-well region 204 and second N+ region 206. Depletion region 208 is associated with PN junction 209. Decap 102 operates in the inversion region (i.e., operation occurring when gate voltages enable the formation of an inversion layer). In one embodiment, maximum capacitance "Co", where $Co=\epsilon_{ox}WL/t_{ox}$, is achieved when Vgs=Vo>Vt, where Vt is the threshold voltage, and Vgs=Vo>=Vgd>Vt. The voltage "Vgs" is a voltage applied across gate terminal 201 and (GND/N+) source terminal 202. The parameters "$\epsilon_{ox}$" and "$t_{ox}$" refer to the permittivity of the gate oxide and the thickness of the gate oxide (210), respectively. The parameters "W" and "L" refer to the height and length of the inversion layer (207), respectively. Maximum capacitance "Co" is achieved, for example, when Vop is 0, Vgs=Vo=Vgd.

The voltage "Vgd" is a voltage applied across gate terminal 201 and drain terminal 203. However, when Vgs=Vo>Vt and Vgd<Vt, gate capacitance decreases (i.e., C<Co). A "C<Co" state occurs when Vgs=Vo>Vt and Vgd<Vt. If Vop is designed to be positive and Vgd=Vo−Vop<Vt when voltage droop V(t)<Vo occurs, the capacitance between VDD/GND is lowered. The P-well is lightly doped so that the depletion region may quickly increase in size when Vgd<Vt. The gate capacitance decreases since capacitance is directly proportional to the area occupied by inversion layer 207.

Figure 3:
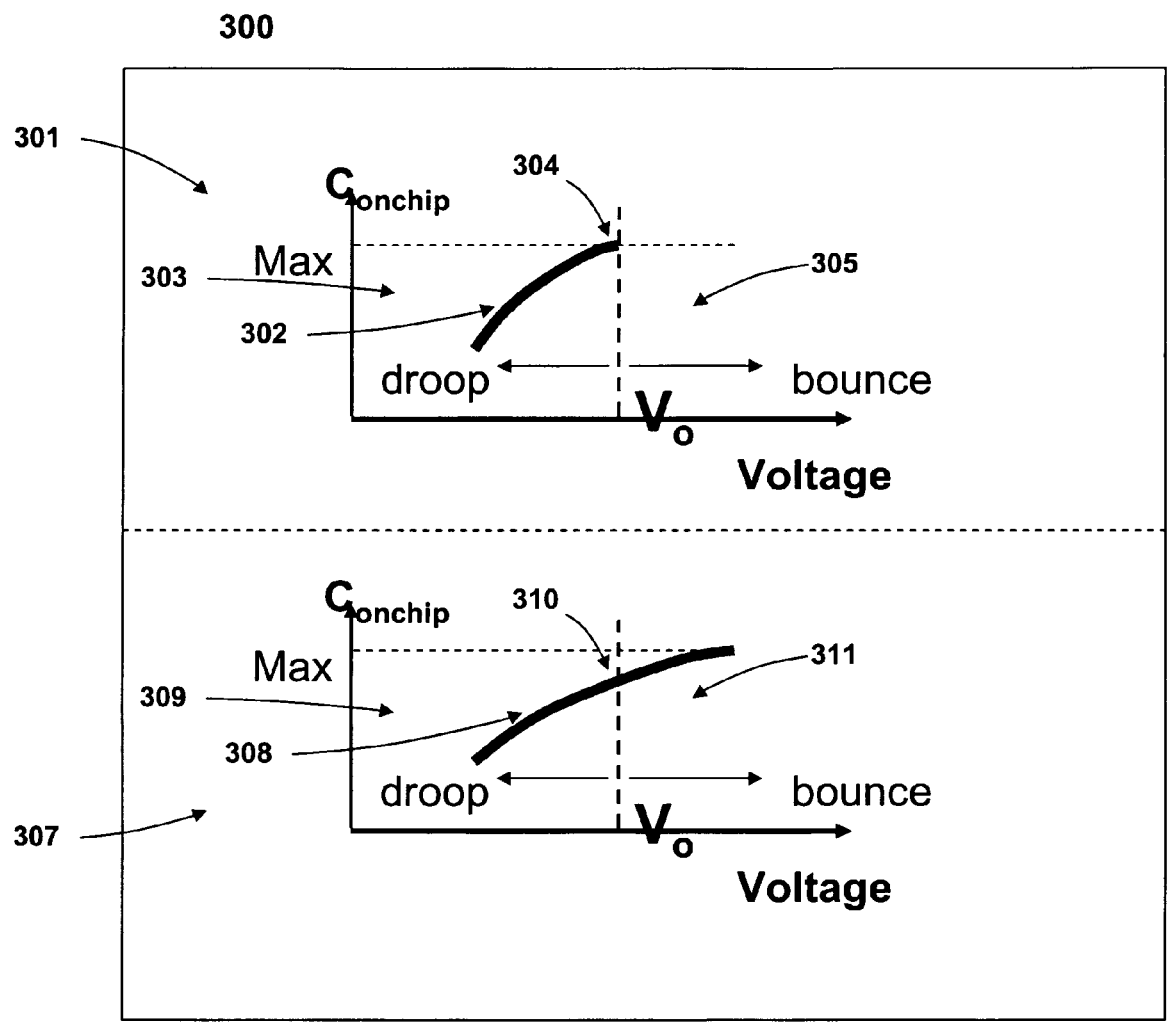
FIG. 3 is a pair of graphs which illustrate capacitor values of two corresponding configurations for the operation of the voltage controlled decoupling capacitor, according to one embodiment of the invention.

FIG. 3 provides a pair of graphs, which illustrates capacitor values of two corresponding configurations for the operation of the voltage-controlled decoupling capacitor, according to one embodiment of the invention. Graph set 300 comprises graph 301 and graph 307. Graph set 300 shows the results of two configuration options for the operation of controlled C_onchip 102. Graph 301 comprises first waveform 302. Graph 301 also comprises voltage droop area 303 and voltage bounce area 305. Also illustrated in graph 301 is first "C-Vo" (location) 304. Graph 307 comprises second waveform 308. Graph 307 also comprises voltage droop area 309 and voltage bounce area 311. Also illustrated in graph 307 is second "C-Vo" (location) 310.

In graph 301, when V(t)=Vo, C_onchip is at a maximum value (304). No extra capacitance is required when a voltage bounce (i.e., V(t)>Vo) occurs. Thus, the configuration (Config1) corresponding to graph 301 only minimizes droop noise. Since droop is usually more critical, Config1 is a viable option. In graph 307, when V(t)>Vo, C_onchip is at a maximum value. With the configuration (Config2) corresponding to graph 307, both voltage droop and bounce are minimized (as illustrated below in FIG. 5). Since total capacitance at Vo is smaller (i.e., second "C-Vo" 310<first "C-Vo" 304), the best noise reduction performance is attained by optimization of parameters which determine the value of C_onchip 102 (illustrated in FIG. 2).

FIGS. 4 (4A, 4B) illustrates the performance of the voltage controlled capacitor and sensor circuitry, according to one embodiment of the invention. FIG. 4 demonstrates simulated noise reduction. The simulation setup of this illustrative embodiment includes the following enumerated components, configurations, and/or factors or considerations: (1) a package model based on a typical microprocessor package; (2) bottom side decoupling with decoupling capacitors (decaps), such as 30X0306 8-terminal decoupling capacitors, for example. Since the simulation provides a mid-frequency noise effect, board assumption has minor effect; (3) Nominal voltage Vo=1.0 V; (4) Total on-chip decap with traditional decap implementation is 165 nF; (5) serial R is 0.5 mW; (6) 71 nF of the total decaps is from the general form of the decap structures. This 71 nF is the portion that may be voltage controlled. The remainder of the capacitances is either from wire capacitance or quiet decap; (7) The maximum capacitance with voltage controlled decaps is also 165 nF in this case; and (8) There are two configuration options for the voltage controlled decaps: Case I: C_onchip is max when V(t)=Vo; C_onchip doesn't change when bounce occurs; C_onchip decreases to 94 nF (i.e., 165-71) when voltage droop is V(t)=Vo−[10% of Vo]. Case II: C_onchip=(165-71)+71/2=129.5 nF; C_onchip increases to 165 when bounce V(t)=Vo+[10% of Vo]; C_onchip decreases to 94 nF (i.e., 165-71) when voltage droop is V(t)=Vo−[10% of Vo].

Figure 4A:
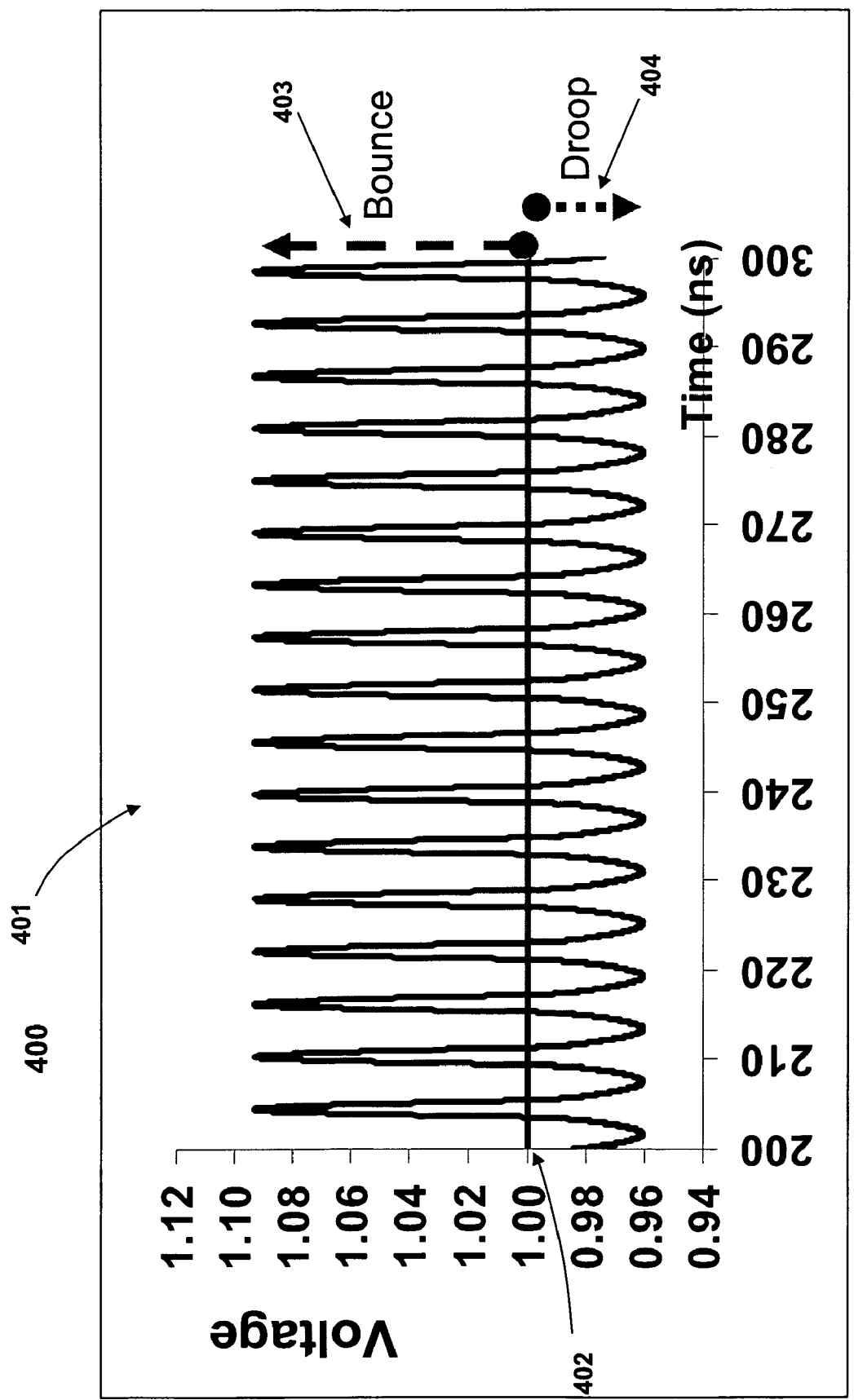
FIGS. 4 (4A, 4B) illustrates the performance of the voltage controlled decoupling capacitor and sensor circuitry, according to one embodiment of the invention.

FIG. 4A illustrates a simulated voltage waveform used to determine the performance of the voltage controlled capacitor and sensor circuitry, according to one embodiment of the invention. Waveform 401 plots voltage (along the y axis) against time (measured in nanoseconds along the x axis). Illustrated in waveform 401 is nominal voltage level (Vo) 402, bounce range 403 and droop range 404.

Waveform 401 illustrates voltage "droop" and "bounce". Waveform 401 is the result of a power supply voltage, which supplies a voltage Vo (illustrated by Vo 402), being stimulated by a switching current I(t). Thus, waveform 401 represents a noisy power supply voltage. The amount of noise in the power supply voltage is indicated by bounce range 403 and droop range 404. Stimulus "I(t)" is a sinusoidal waveform defined as follows: I(t)=Io+5.0*sin(2*pi*f), where frequency "f" changes from 10 MHz to 1 GHz. Stimulus "I(t)" is a sinusoidal current with peak-to-peak swing of 10 A.

Figure 4B:
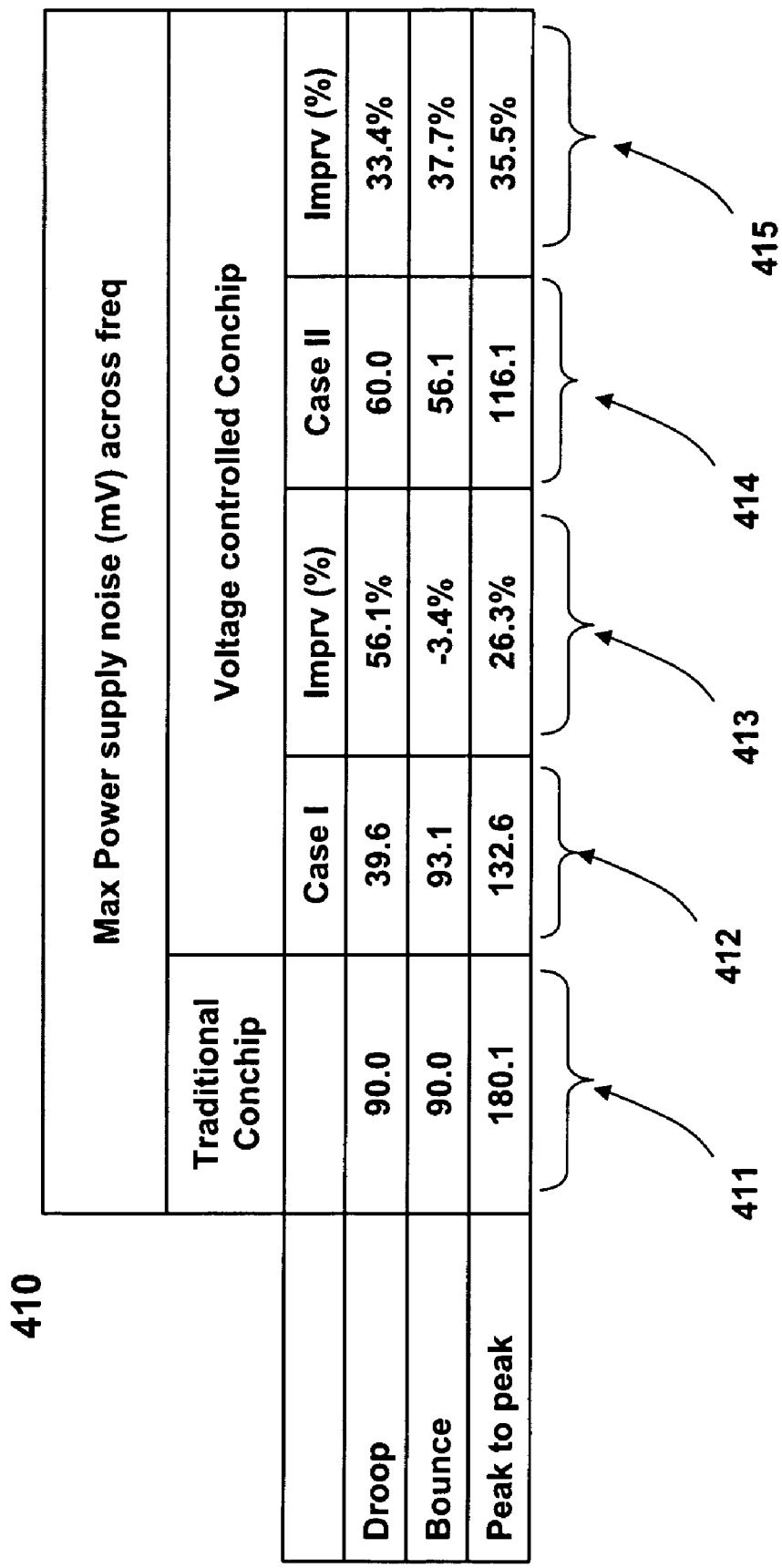

FIG. 4B is a table which illustrates the impact of the voltage controlled capacitor and sensor circuitry to a varying voltage waveform, according to one embodiment of the invention. Table 410 comprises the following: (1) a column of performance (i.e., voltage measured in milliVolts, "mV") values for a traditional fixed decoupling capacitor, illustrated as Ctrad 411; (2) a column of performance values for a Case 1 voltage dependent capacitor, illustrated as C1_onchip 412; (3) a column of performance values for a Case 2 voltage dependent capacitor, illustrated as C2_onchip 414; (4) a column of improvement percentages of C1_onchip compared with Ctrad, illustrated as C1_imprv 413; and (5) a column of improvement percentages of C2_onchip compared with Ctrad, illustrated as C2_imprv 415. The performance values include the droop and bounce values of ΔV for each corresponding case.

Table 410 provides a summary of the worst power droop/bounce across the frequency range. The performance of C1_onchip 412 is described based on C1_onchip 412 and C1_imprv 413. As expected, C1_onchip 412 does not alleviate the voltage bounce because C1_onchip 412 does not change when a voltage bounce occurs. However, C1_onchip 412 is able to halve the droop noise, which is usually more of an issue in integrated circuits. The performance of C2_onchip 414 is described based on C2_onchip 414 and C2_imprv 415. As shown, C2_on-chip 414 equally reduces droop and bounce noises.

Figure 5:
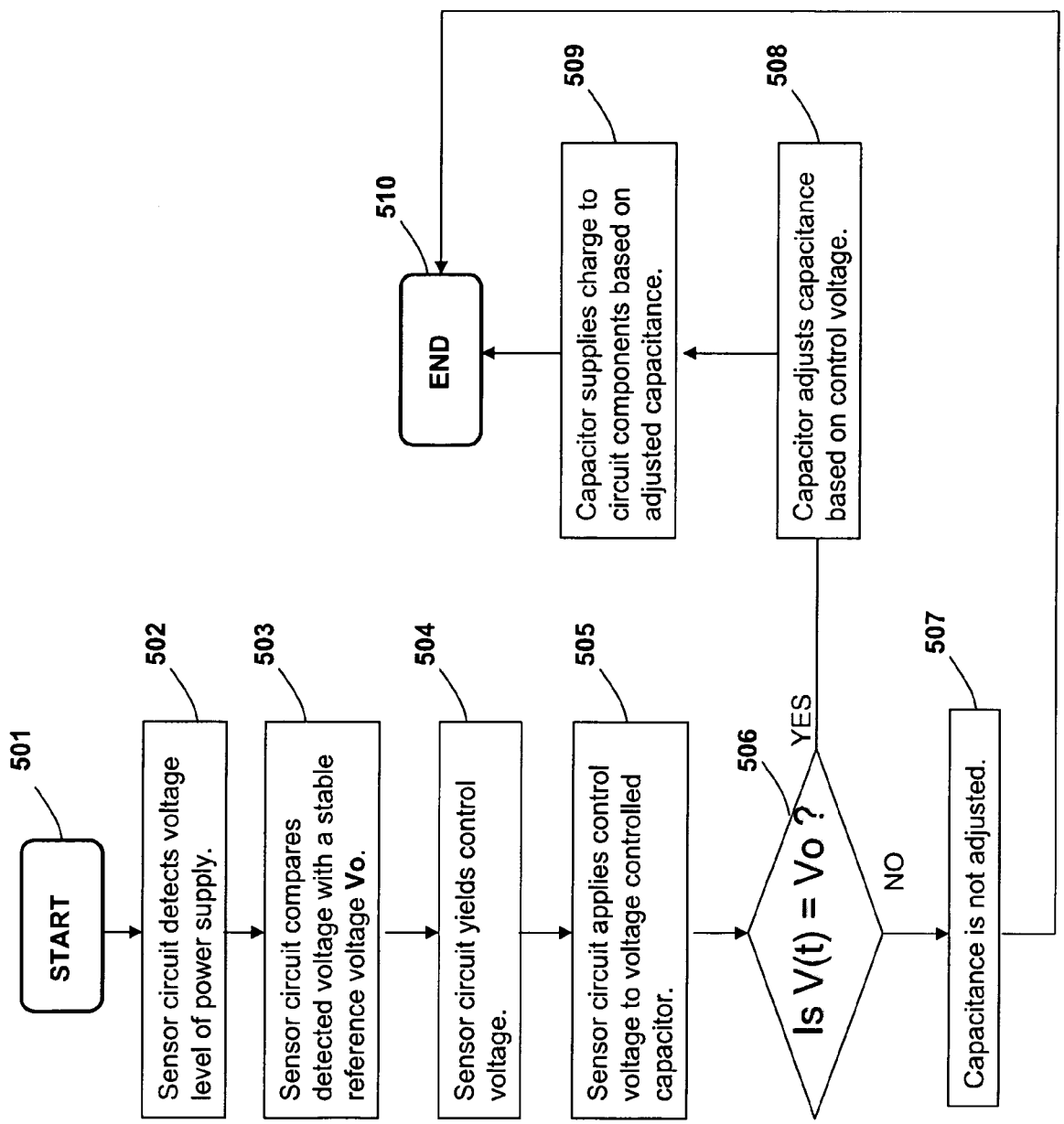
FIG. 5 is a flow chart illustrating the noise reduction process with the utilization of a voltage sensor circuit and a voltage controlled decoupling capacitor, according to one embodiment of the invention.

FIG. 5 is a flow chart illustrating the noise reduction process with the utilization of a voltage sensor circuit and a voltage controlled capacitor, according to one embodiment of the invention. Although the method illustrated in FIG. 5 may be described with reference to components and illustrations provided by FIGS. 1-4, it should be understood that this is merely for convenience and alternative components and/or configurations thereof can be employed when implementing the various methods.

The process of FIG. 5 begins at initiator block 501 and proceeds to block 502, at which sensor circuit 107 detects the voltage level of a power supply system 103. At block 503, sensor circuit 107 compares the detected voltage level with a stable reference voltage (109). Based on the voltage comparison, sensor circuit 107 yields control voltage, Vop 112, as shown at block 504. Sensor circuit 107 applies Vop 112 to the voltage controlled capacitor (102), at block 505. The capacitance of C_onchip 102 is adjusted only if a voltage variation is detected by sensor circuit 107. Thus, Vop 112 yielded by sensor circuit 107 is proportional to the voltage variation detected. At decision block 506, C_onchip 102 determines whether the magnitude of the control voltage (Vop 112) is greater than 0 (i.e., V(t) not equal to V0). If at block 506, C_onchip 102 determines that the absolute magnitude of the control voltage (Vop 112) is not greater than 0 (i.e., V(t)=Vo), the process enters block 507, at which the capacitance of C_onchip 102 is not adjusted (i.e., the current capacitance is maintained). If at block 506, C_onchip 102 determines that the absolute magnitude of the control voltage (112) is greater than 0 (i.e., V(t) not equal to Vo), the process enters block 508, at which C_onchip 102 adjusts the capacitance based on the value of the control voltage. C_onchip 102 supplies more (or less) charge to various circuit components based on the adjusted capacitance, as shown at block 509. The process ends at block 510.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

The on-chip decoupling capacitor reduces power supply noise in the core power supply and the input/output (I/O) power supply, as well as within other power supplies. In the simulated case, droop noise may be halved. Reduced noise may be directly translated into higher Fmax or smaller chip size in cases. The on-chip decoupling structure may be maintained to ensure compatibility with standard manufacturing processes. In a simple case, only one operational amplifier is needed. Multiple OpAmps may be utilized when local noises need be monitored and to minimize the delay from OpAmps to decaps.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An electrical circuit comprising:
   a power supply system sub-circuit (PSSC) having a dynamic voltage controlled decoupling capacitor connected to a power supply that generates a power supply voltage, wherein the PSSC further comprises a switching current supply connecting a gate node and a source node of the dynamic voltage controlled decoupling capacitor and the power supply, wherein the power supply, dynamic voltage controlled decoupling capacitor, and switching current supply are connected in parallel; and
   a voltage sensor sub-circuit (VSSC) that detects a voltage variation within the power supply voltage that is causing a varying voltage level of the power supply voltage and generates a control voltage that is directly applied to a drain node of the dynamic voltage controlled decoupling capacitor to compensate for the voltage variation and reduce a level of noise in the power supply voltage, wherein the voltage variation is caused by one or more switching currents within the power supply.

2. The electrical circuit of claim 1, wherein the power supply voltage is a variable power supply voltage.

3. The electrical circuit of claim 1, wherein the VSSC comprises an operational amplifier (OpAmp) that monitors the varying voltage level of the power supply voltage, the OpAmp having:
   a first input that is coupled to the power supply voltage;
   a second input that is coupled to a reference voltage of the power supply; and
   an output applied to the dynamic voltage controlled decoupling capacitor, wherein the OpAmp provides the control voltage at the output, wherein the control voltage that is applied to the dynamic voltage controlled decoupling capacitor enable adjustment of a capacitance of the dynamic voltage controlled decoupling capacitor.

4. The electrical circuit of claim 1, wherein the VSSC dynamically increases the control voltage applied to the drain node of the dynamic voltage controlled decoupling capacitor to increase the capacitance of the dynamic voltage controlled decoupling capacitor responsive to detecting an increasing voltage variation, and decreases the control voltage applied to the drain node of the dynamic voltage controlled decoupling capacitor to decrease the capacitance of the dynamic voltage controlled decoupling capacitor responsive to a decreasing voltage variation.

5. The electrical circuit of claim 3, wherein:
   the control voltage is calculated as a difference between the varying voltage level of the power supply voltage and a stable reference voltage of the power supply multiplied by a gain (A); and
   the dynamic voltage controlled decoupling capacitor is a voltage dependent on-chip decoupling capacitor controlled by the control voltage.

6. The electrical circuit of claim 5, wherein:
   when a voltage drop below a pre-set nominal voltage, corresponding to the reference voltage, is detected, the capacitance of the dynamic voltage controlled decoupling capacitor substantially decreases; and
   when there is a voltage increase, corresponding to the power supply voltage being greater than the reference voltage, the capacitance of the dynamic voltage controlled decoupling capacitor substantially increases.

7. The electrical circuit of claim 5, wherein:
   the dynamic voltage controlled decoupling capacitor includes a total on-chip capacitance charge, and a calculated portion of the total charge is supplied across the dynamic voltage controlled decoupling capacitor based on the value of the control voltage to reduce the noise generated by the power supply voltage; and the dynamic voltage controlled decoupling capacitor acts as a local voltage booster to pull up an applied voltage on the transistors when the power supply voltage is less than the reference voltage of the power supply and to pull down the applied voltage on the transistors when the power supply voltage is greater than the reference voltage.

8. The electrical circuit of claim 1, wherein the voltage sensor sub-circuit (VSSC) is one of a plurality of VSSCs that collectively provides the control voltage utilized to substantially eliminate a level of noise within the electrical circuit.

9. In an electrical device, a method comprising:
automatically sensing a voltage variation between a voltage level of a power supply and a reference voltage of the power supply of the electrical device;
in response to sensing a voltage variation, dynamically reducing a noise level of the power supply utilizing a dynamic voltage controlled decoupling capacitor, wherein the voltage variation between the voltage level of the power supply voltage and the reference voltage of the power supply indicates a presence of noise within the electrical device;
in response to the detected voltage level of the power supply voltage not being equal to the voltage level of the reference voltage, generating a control voltage that reduces a level of noise in the electrical circuit caused by a plurality of voltage variations within the power supply; and
applying the control voltage directly to a drain node of the dynamic voltage controlled decoupling capacitor;
wherein the power supply is included within a power supply system sub-circuit (PSSC), the PSSC having the dynamic voltage controlled decoupling capacitor connected to the power supply that generates a power supply voltage, wherein the PSSC further comprises a switching current supply connecting a gate node and a source node of the dynamic voltage controlled decoupling capacitor and the power supply, wherein the power supply, dynamic voltage controlled decoupling capacitor, and switching current supply are connected in parallel; and
wherein the automatically sensing is performed by a voltage sensor sub-circuit (VSSC) that detects the plurality of voltage variations within the power supply voltage that are causing a varying voltage level of the power supply voltage and reduces a level of noise in the electrical circuit, wherein the plurality of voltage variations are caused by one or more switching currents within the power supply.

10. The method of claim 9, the method further comprises:
automatically comparing the voltage level of the power supply voltage with the reference voltage of the power supply.

11. The method of claim 9, further comprising:
in response to detecting an increasing voltage variation, dynamically increasing the control voltage applied to the drain node of the dynamic voltage controlled decoupling capacitor to increase a capacitance of the dynamic voltage controlled decoupling capacitor; and
in response to detecting a decreasing voltage variation, dynamically decreasing the control voltage applied to the drain node of the dynamic voltage controlled decoupling capacitor to decrease the capacitance of the dynamic voltage controlled decoupling capacitor.

12. The method of claim 9, wherein:
the voltage variation is generated by switching currents within the power supply; and the control voltage adjusts a capacitance of the dynamic voltage controlled decoupling capacitor to allow the dynamic voltage controlled decoupling capacitor to compensate for effects of the voltage variation by supplying a different amount of charge to one or more components of the electrical device, wherein the different amount of charge efficiently reduces noise related to the variations in the voltage from the power supply.

13. The method of claim 9, wherein the dynamically reducing further comprises:
modifying a capacitance of the dynamic voltage controlled decoupling capacitor relative to a magnitude of the control voltage.

14. The method of claim 13, wherein:
a modification to the capacitance of the dynamic voltage controlled decoupling capacitor compensates for one or more noise effects resulting from the voltage variation, wherein the one or more noise effects include a shortage of a quantity of charge;
the dynamic voltage controlled decoupling capacitor is a single dynamic capacitor; and
the capacitance of the dynamic voltage controlled decoupling capacitor attains a maximum value at a specified voltage level, and wherein the specified voltage level is based on a configuration of the dynamic voltage controlled decoupling capacitor.

15. An electrical device comprising:
a power supply which supplies a power supply voltage, wherein a voltage level of the power supply voltage experiences a plurality of voltage variations;
a dynamic voltage controlled decoupling capacitor coupled to the power supply;
a switching current supply connecting a gate node and a source node of the dynamic voltage controlled decoupling capacitor and the power supply, wherein the power supply, dynamic voltage controlled decoupling capacitor, and switching current supply are connected in parallel; and
a sensor sub-circuit that detects the plurality of voltage variations within the power supply voltage that are causing a varying voltage level of the power supply voltage reduces a level of noise within the device that is attributable to the voltage variations, wherein the plurality of voltage variations are caused by one or more switching currents within the power supply;
wherein the sensor sub-circuit further provides the functionality of:
automatically sensing a voltage variation between a voltage level of the power supply and a reference voltage of the power supply within the electrical device; and
in response to sensing a voltage variation, dynamically reducing a noise level of the power supply utilizing a dynamic voltage controlled decoupling capacitor, wherein the voltage variation between the voltage level of the power supply and the reference voltage of the power supply indicates a presence of noise within the electrical device;
in response to the detected voltage level of the power supply voltage not being equal to the voltage level of the reference voltage, generating a control voltage that reduces a level of noise in the electrical circuit caused by the plurality of voltage variations; and
applying the control voltage directly to a drain node of the dynamic voltage controlled decoupling capacitor.

16. The device of claim 15, wherein the sensor sub-circuit further provides the functionality of:

automatically comparing the voltage level of the power supply voltage with the reference voltage of the power supply.

17. The device of claim 16, wherein the sensor sub-circuit applies the control voltage to the dynamic voltage controlled decoupling capacitor to provide the functions of:
   in response to detecting an increasing voltage variation, dynamically increasing the control voltage applied to the drain node of the dynamic voltage controlled decoupling capacitor to increase a capacitance of the dynamic voltage controlled decoupling capacitor; and
   in response to detecting an decreasing voltage variation, dynamically decreasing the control voltage applied to the drain node of the dynamic voltage controlled decoupling capacitor to decrease the capacitance of the dynamic voltage controlled decoupling capacitor.

18. The device of claim 15, wherein:
   the voltage variation is generated by switching currents within the power supply; and
   the control voltage adjusts a capacitance of the dynamic voltage controlled decoupling capacitor to allow the dynamic voltage controlled decoupling capacitor to compensate for effects of the voltage variation by supplying a different amount of charge to one or more components of the electrical device, wherein the different amount of charge efficiently reduces noise related to the variations in the voltage from the power supply.

19. The device of claim 18, wherein the functionality for dynamically reducing further provides:
   modifying a capacitance of the dynamic voltage controlled decoupling capacitor relative to a magnitude of the control voltage, wherein the dynamic voltage controlled decoupling capacitor is a single dynamic capacitor; and
   wherein:
      a modification to the capacitance of the dynamic voltage controlled decoupling capacitor compensates for one or more noise effects resulting from the voltage variation, wherein the one or more noise effects include a shortage of a quantity of charge; and
      the capacitance of the dynamic voltage controlled decoupling capacitor attains a maximum value at a specified voltage level, and wherein the specified voltage level is based on a configuration of the dynamic voltage controlled decoupling capacitor.

20. The electrical circuit of claim 1, wherein the dynamic voltage controlled decoupling capacitor is a single dynamic capacitor.

* * * * *